Aug. 7, 1956

E. H. F. W. ROLF 2,758,271

MECHANICAL CONTACT CONVERTERS WITH MAGNETICALLY
CONTROLLED CONTACT DEVICES

Filed Sept. 5, 1952

United States Patent Office 2,758,271
Patented Aug. 7, 1956

2,758,271

MECHANICAL CONTACT CONVERTERS WITH MAGNETICALLY CONTROLLED CONTACT DEVICES

Erich H. F. W. Rolf, Nurnberg, Germany, assignor to Siemens-Schuckertwerke Aktiengesellschaft, Erlangen, Germany, a corporation of Germany Application September 5, 1952, Serial No. 308,108

Claims priority, application Germany September 15, 1951

8 Claims. (Cl. 321—48)

My invention relates to electric current converters operating with electromagnetically controlled contact devices which make and break the converter circuit in synchronism with the voltage cycle of an alternating current to be converted. More particularly, the invention deals with converters of the type in which a movable contact member, biased towards its open position and moved electromagnetically to its closed position, is series connected with a saturable reactor (commutation reactor) whose periodically reversing saturation, occurring near the zero passages of the current wave, modifies that wave into a temporarily stepped shape to provide corresponding intervals of slight or zero current magnitude within which the contact device may operate under favorable make and break conditions.

It is known to connect in such converters the main control coil of the synchronous contact device serially into the circuit controlled by the pertaining contact member so that the magnet coil is traversed by the contact current and, thus energized, secures the required contact pressure until the current wave declines to an instantaneous current value sufficiently small to release the contact member for break operation. In the known converters of this type a valve circuit extends across the contact gap to initially conduct the converter load current at the beginning of the positive current half-cycle until this current, flowing also through the magnet coil, reaches the magnitude required for the coil to close the contact gap and then shorts the valve circuit. Since in such converters, the magnet coil is energized by the load current, this current must have a finite and sufficiently large instantaneous magnitude before the contact device can close. Consequently, the make step provided by the commutation reactor cannot be utilized to full advantage and the make moment cannot occur at a time when the make step current is zero.

It has therefore been proposed, to control the closing operation of the electromagnetic contact device independently of the incipient contact or load current by a synchronous control current flowing in a separate control circuit. These converters have their contact devices equipped with a second magnet coil which is connected in the control circuit and traversed by a pulse of the control current at the moment when the contact device is to close. Such converters are disclosed in the copending application of E. Rolf and M. Belamin for Electric Contact Converters With Electromagnetically Controlled Contacts, Serial No. 278,386, filed March 25, 1952, and assigned to the assignee of the present invention.

It is an object of my invention to improve converters of the above-mentioned type toward a simplified design of their electromagnetic devices and pertaining circuits, without foregoing the versatility of control and other advantages inherent in the provision of a separate control circuit.

To this end, and in accordance with a feature of my invention, I connect the main-current coil of the electromagnetic contact device into, or with, the separate control circuit so that the coil is the only controlling link of the control circuit with the contact device. In such a converter, only one coil, namely the contact-pressure producing load-current coil, is required for controlling the break performance as well as the make performance; and the control circuit for exciting this coil extends parallel to the series arrangement comprising the saturable reactor and the movable contact member. The control circuit provides the coil with a control pulse of a desired moment ahead of the make-step interval and within the positive half-wave of the driving voltage of the converter circuit so as to supply the contact device with the attractive force needed for closing the converter circuit in any desired phase relation to the make-step interval; and the same control circuit may also serve to temporarily maintain the contact closing force during the break-step interval after the contact current has declined below the drop-off magnitude, so that the break moment may also be controlled to occur at any desired time point within the break-step interval.

The foregoing and other objects, advantages and features of my invention are apparent from the following description of the embodiments exemplified on the drawing in which.

Figure 1:
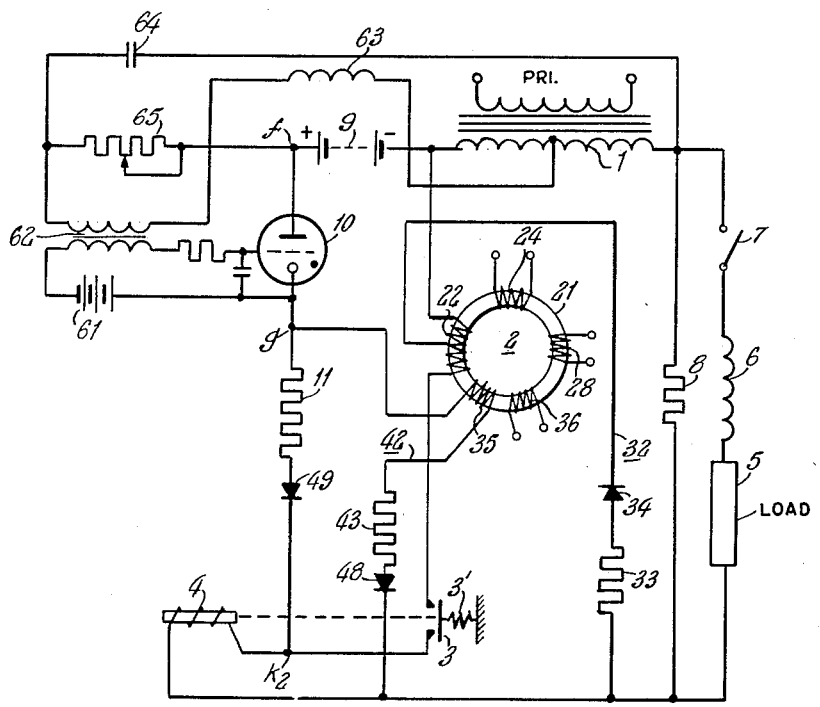
Fig. 1 shows the circuit diagram of a contact converter according to the invention.

All illustrated converters are shown as single-phase rectifiers, it being understood that full-wave rectifiers or multiphase converter circuits may be designed in a similar manner by joining a corresponding plurality of the illustrated converter circuits in a cyclically sequential arrangement and operation. Corresponding circuit elements are denoted by the same reference characters in all illustrations.

According to Fig. 1 the secondary winding of an otherwise not illustrated power transformer serves for supplying the converter circuit with alternating voltage. The converter circuit connected to the transformer winding 1 comprises a saturable commutation reactor 2 and a synchronous contact device whose movable contact member 3 is biased, for instance by a spring 31, toward its open position and is controlled by a single magnet coil 4 which, when energized, closes the contact member 3 against its bias and holds it in the closed position as long as a sufficient energizing current is flowing through the coil. The contact member 3 and the magnet coil 4 are series connected with each other and with the main winding 22 of the commutation reactor 2. The direct-current portion of the converter circuit includes a load 5 in series with a smoothing reactor 6 and a load switch 7. A base load 8 is connected across the direct-current portion of the converter circuit to prevent the direct current from dropping below a desired minimum value when the load switch 7 is open.

The contact device operates in synchronism with the alternating voltage of the power transformer so that the contact member 3 is closed only during a given (positive) half-wave period of the converter current. Consequently, only the positive current half waves are transmitted to the direct-current load portion of the circuit. The reactance of the saturable commutation reactor 2 is negligible during most of the duration of the current cycle due to the fact that the magnetizable core 21 of the reactor becomes saturated at a small instantaneous value of the reactor current. In the vicinity of the current zero passage, that is when the current during a conducted half-wave declines to vary small instantaneous values, the reactor becomes unsaturated and subsequently remagnetized to saturation of the opposite polarity. During these short reversing intervals the reactance of the commutation reactor effective in the converter circuit rises to a high value and depresses the small instantaneous current values. This produces a step in the current curve for an interval of time (break-step interval) during which the instantaneous current remains sufficiently small for opening the contact member 3 without sparking. A similar current step (make step) is also produced when the contact member 3 closes.

It will be recognized from Fig. 1 that once the contact member 3 is closed at a moment near the beginning of a positive current half wave, the increasing current, effective in the magnet coil 4, keeps the contact member 3 in its closed position until the current, near the end of the positive half-cycle, again declines toward its zero value. Then the magnetization of coil 4 drops below the critical value so that the bias of contact member 3 becomes effective to open the circuit within the break-step interval. Thereafter the contact member 3 remains open and hence cannot transmit a negative half-wave of current to the load portion of the converter circuit. Since at the beginning of the next following positive half-cycle the contact 3 is open, the electric condition of the converter circuit cannot on its own account cause the magnet coil 4 to close the converter circuit at the proper moment. For then closing the contact member 3, a separate control circuit is provided. The control circuit is connected across the series arrangement comprising the main winding 22 of the commutation reactor 2 and the contact member 3. The control circuit includes a separate current source of direct or alternating voltage here exemplified by a battery 9. The control circuit further includes a controllable valve 10, for instance, a thyratron or other controllable electronic tube. Series connected with valve 10 is an adjusting or calibrating resistor 11. As will be explained, a current pulse produced in the control circuit flows through the magnet coil 4 at the proper time to then effect the closing of contact member 3. The proper conditions for this make performance, however, exists only if the voltage drop across the series connection of reactor winding 22 and contact member 3 has a positive polarity. That is, the control circuit must be so poled relative to that voltage drop that this voltage drop drives a current through the contact member 3 and through the converter load in the predetermined direction for which the magnetization of coil 4 caused by the control circuit is cumulative to that produced in the same coil by the load current that will thereafter flow through the closed contact member 3. To this end the voltage of source 9 is made slightly larger than the ignition voltage of the control valve 10. The make moment, provided the just-mentioned conditions are satisfied, may be selected at will, for instance, by means of the grid control circuit of tube 10. In this manner the rectified output voltage of the converter can be varied for control and regulating purposes by corerspondingly delaying the closing moment of contact member 3 (voltage control on the delayed-commutation principle).

The grid circuit of tube 10, as exemplified in Fig. 1, comprises a source 61 of grid bias voltage and a transformer 62 whose primary is energized through a choke coil 63 from a tapped-off portion of the secondary 1 in the power supply transformer, a phase-shift circuit with a capacitor 64 and an adjustable control rheostat 65 being interposed to permit adjusting the ignition moment of tube 10 to the proper phase position relative to the cycle period of the supply voltage.

Figure 2:
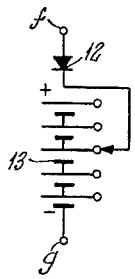
Figs. 2 and 3 show respective modifications of a circuit portion of the same converter.
Figure 3:
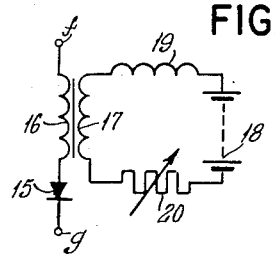

Instead of an electronic valve 10 shown in Fig. 1, a modified valve circuit as shown in Figs. 2 and 3 may be used, each of the circuit portions according to these figures being substituted for valve 10 between the circuit points $f$ and $g$ indicated in Fig. 1.

The circuit portion shown in Fig. 2 consists in the series connection of an uncontrolled valve 12 with a direct current source 13 of controllable voltage which provides a voltage in the blocking direction of the valve 12. The valve 12 may consist of a barrier layer rectifier or a diode. The regulating range of this substitute portion is smaller and comprises only the time period in which the switched-in converter voltage is increasing.

This limitation does not apply to the embodiment of Fig. 3. This modification comprises a transductor 14 whose magnetic characteristic, in its unsaturated region, is inclined toward the flux axis. Such a transductor is essentially a saturable reactor whose core is premagnetized by direct current. The main winding 16 of transductor 14 is series connected with a two-electrode valve 15. The premagnetizing control winding 17 of the transductor is excited by direct current from any suitable voltage source, for instance a battery 18, through a stabilizing reactor 19 and a control resistor 20 in such a manner that the initial condition of the transductor lies in the unsaturated region of its magnetic characteristic. Such a valve-reactor combination produces unidirectional current pulses whose time point relative to the half cycle of an alternating voltage may be adjusted at will by correspondingly varying the direct current premagnetization, i. e. by changing the resistance setting of resistor 20.

Figure 4:
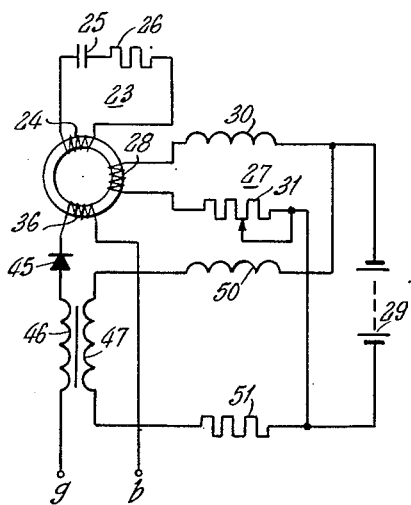
Fig. 4 is a circuit diagram supplementing that of Fig. 1 and showing auxiliary premagnetizing circuits.

For controlling and adapting the make steps and break steps of the converter current, the magnet core 21 of the commutation reactor 2 carries, aside from the above-mentioned main winding 22, a number of auxiliary windings denoted by 24, 28 and 36 in Fig. 1 and separately shown in Fig. 4 in conjunction with the pertaining circuits.

Connected to the auxiliary winding 24 is a shaping or stretching circuit 23 which, for instance in the simplest case, consists of a capacitor 25 and a series resistor 26. This shaping circuit serves to make the current step substantially horizontal so that the residual step current, obtaining during the interval of the step, maintains a uniform magnitude. The auxiliary winding 28 is connected in a premagnetizing circuit which supplies a constant component of the premagnetization effective in the commutation reactor during the break-step interval. The premagnetizing circuit 27 is connected to a suitable direct current source 29 and includes a stabilizing reactor 30 and an adjustable resistor 31 in series connection with the auxiliary reactor winding 28. This circuit is designed in accordance with my copending application for Electric Contact Converters, Serial No. 278,385, filed March 25, 1952, and assigned to the assignee of the present invention.

As shown in Fig. 1, an auxiliary circuit 32 may be provided in order to supply a voltage-responsive component of the break premagnetization, i. e. the premagnetization effective in the commutation reactor during the break-step interval. The auxiliary circuit 32 permits calibrating the above-mentioned step current to the zero value as explained in my just-mentioned copending application Serial No. 278,385. The auxiliary circuit 32 extends from a circuit point, preferably the midpoint, of the reactor main winding 22 to a load-side circuit point of the contact member 3 and includes a calibrating resistor 33 in series connection with a valve 34. While in Fig. 1 the load-side point of auxiliary circuit 32 electrically coincides with point $b$ of the converter circuit, it may also be connected to a point $k_2$ between contact member 3 and magnet coil 4.

The valve 34 in auxiliary circuit 32 may be omitted if the converter operates always at the maximum obtainable output voltage or if only a slight degree of output-voltage control is to be taken into account. That is, the valve 34 serves a purpose essential only when the converter system is designated to permit a wide-range control or regulation of its rectified output voltage by the delayed commutation method. Then the valve 34 prevents the commutation reactor, when under the influence of the positive voltage half wave, from becoming prematurely saturated in the direction of the incipient flow of current, so that the reactor remains in the state of opposingly directed saturation until the control pulse for initiating the make performance of contact member 3 is issued. As a result, at least a portion of the make-step interval must expire immediately subsequent to the make moment of contact member 3 before the current flowing through the contact member 3 can commence its increase.

For modifying the make step, the converter may be provided with auxiliary premagnetizing devices as also described in my copending application Serial No. 278,385. Such a premagnetizing device, as exemplified in Fig. 1, may comprise an auxiliary circuit 42 which includes a separate auxiliary winding 35 on the commutation reactor 2 in series with a calibrating resistor 43. The circuit 42, energized from the converter voltage to be switched in, supplies the winding 35 with a component make premagnetization for reactor 2. The proper timing of the beginning of this component premagnetization depends upon the control of the above-described valve 10 or the equivalent circuit means shown in Figs. 2 and 3, although if desired circuit 42 may also be provided with a separate discharge valve or an equivalent control device. Such a control of the make premagnetization, in coaction with the operation of the auxiliary reactor winding 36, still to be described, has the result that the polarity reversal of the saturation in the commutation reactor commences previous to the make moment of contact member 3 at the same instant at which the control current for causing the magnet coil 4 to close the contact member 3 commences. In other words, the conditions which cause the commutation reactor to reverse its premagnetization are established together with the initiation of the control signal that causes the coil 4 to operate. Consequently, the control current in coil 4 reaches the value sufficient for closing the contact member 3 always at a moment so related to the make-step interval that the make moment of contact member 3 always occurs within that interval. It will be recognized that such a dependence of the make premagnetization upon the occurrence of the make signal affords an automatic adaptation of the make premagnetization to any operating condition that may occur throughout the entire available range of voltage control.

Figure 5:
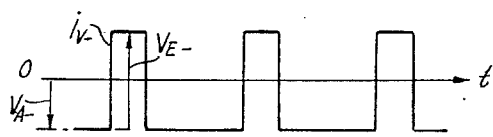
Fig. 5 is an explanatory voltage-time diagram relating to the operation of the premagnetizing circuits shown in Fig. 4.

While, as explained, the auxiliary reactor winding 35 (Fig. 1) supplies a voltage-dependent component of make premagnetization to the commutation reactor 2, another component make premagnetization is supplied by means of the auxiliary reactor winding 36. This other component has a constant magnitude. It is needed because the direct-current premagnetization supplied by the auxiliary winding 28 for securing optimum break performance has the wrong direction with respect to the make performance. It is therefore necessary to provide temporarily during the range of time within which the contact may close, a resulting magnetic flux which cooperates in providing the then desired constant component premagnetization and whose direction is opposed to the flux direction effective during the break performance. Such a resultant flux may be provided, for instance, by superimposing upon the constant break premagnetization, supplied by winding 28, a current pulse of approximately constant amplitude and the opposed magnetizing direction. This pulse is applied to the auxiliary winding 36. To this end, the auxiliary winding 36, as shown in Fig. 4, is connected to a source of alternating voltage through a premagnetized transductor 44 operating as a pulse transmitter. The main winding 46 of transductor 44 is series connected with a valve 45 to pass through the winding 36 a series of short-lasting current pulses. The polarity of connection is such that these pulses have a magnetizing effect upon the core 21 of the commutation reactor 2 opposed to the magnetizing effect of the direct current flowing through winding 28. Such a circuit arrangement is also disclosed in my copending application Serial No. 278,385. The coordinate diagram of Fig. 5 shows schematically, in dependence upon time $t$, the superposition of the two magnetic excitations caused by the two auxiliary windings 28 and 36. The excitation of winding 28 is represented by a line parallel to the zero axis and located below that axis at a distance $V_{A-}$ corresponding to the constant component of the break premagnetization supplied by winding 28. The make premagnetization $V_{B-}$ has an approximately rectangular curve shape due to the fact that the pulse current is approximately constant after the transductor 44 enters into its unsaturated condition. The resultant of the two superimposed magnetizations includes the constant components of the premagnetization for the break performance as well as for the make performance and corresponds to the current wave $i_{V-}$. The positive and negative values of $i_{V-}$, as regards their absolute magnitudes, may differ from each other. The auxiliary circuit of winding 36 (Fig. 4) is preferably connected between the point $g$ and either point $b$ or $k_2$ (see Fig. 1) of the converter circuit. With such a connection, the phase position of the positive pulses in winding 36 is determined by the controlled ignition time point of the valve 10. The premagnetizing winding 47 of transductor 44 is excited from any suitable source of direct voltage through a stabilizing reactor 50 and an adjusting resistor 51. For instance, as shown in Fig. 4, the just-mentioned circuit may be energized from the same voltage source 29 that provides constant excitation for the auxiliary reactor winding 28.

The valves 48 and 49 shown in Fig. 1 may be provided in the control circuit of magnet coil 4 and the auxiliary circuit of winding 35, respectively, in order to exclude the possibility of currents flowing in these circuits in the wrong direction.

Figure 6:
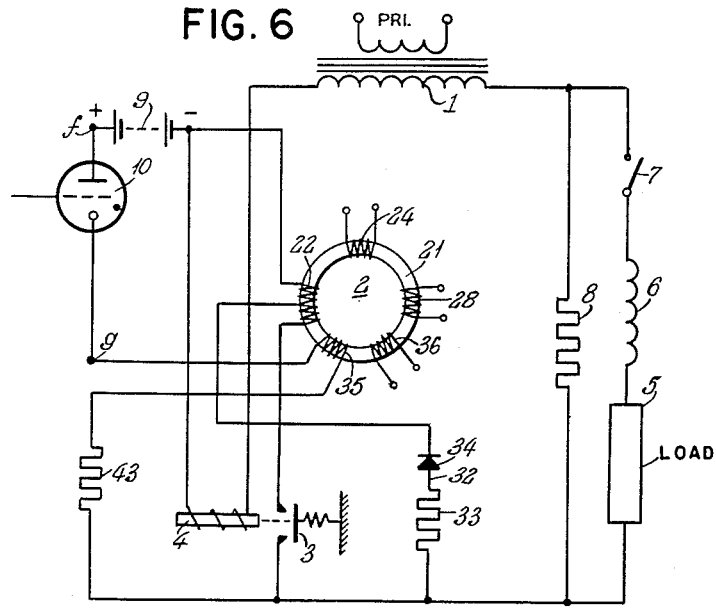
Fig. 6 shows the circuit diagram of another contact converter according to the invention.

The end point of the auxiliary circuit 42 for winding 35 at the load side of the converter circuit may be located at circuit point $k_2$ instead of at point $b$. This modification is apparent from the embodiment illustrated in Fig. 6 which further differs from that of Fig. 1 in that the circuit portion extending through the resistor 11 is omitted. In the embodiment of Fig. 6, therefore, the entire control current serving for controlling the make operation of the synchronous contact device is also utilized for providing the voltage-dependent make premagnetization in the auxiliary reactor winding 35. Besides, as also shown in Fig. 6, the control coil 4 of the synchronous contact device may be connected in the alternating-current portion of the converter circuit rather than in the direct current portion.

While various circuit modifications applicable in converters according to the invention are mentioned in the foregoing, it will be understood that other auxiliary or accessory circuit means are likewise applicable, including the various other modifications disclosed in the copending applications mentioned in this specification. For instance, it is possible to automatically control, with the aid of coil 4, the break performance in such a manner that the contact separation always commences during the break step. For this purpose, the control current released by the valve 10 (Fig. 1 and Fig. 6) or the corresponding devices (Figs. 2 and 3) for initiating the make operation of the contact device, is maintained at a constant magnitude above the critical drop-out value of the magnet system for a period of time from the termination of the make-step interval to the beginning of the break-step interval. This requires merely a corresponding selection of the voltage supplied from source 9 and of the ohmic resistances effective in the control circuit. When the break step commences, the voltage simultaneously appearing across the commutation reactor causes the valve 10 to be cut off. Only then can the control current fully disappear in coil 4 so that the contact member will open during the break-step interval when the load current in coil 4 passes below the drop-out value of the magnet system.

The premagnetizing devices described in the foregoing with reference to Figs. 1 to 4 afford a practically complete compensation of the residual step current down to the zero value and hence are capable of satisfying the most exacting requirements. For lesser requirements, a satisfactory operation, at least within a limited range of voltage control, may also be achieved with simplified means, for instance as described in the following with reference to Figs. 7 and 8.

Figure 7:
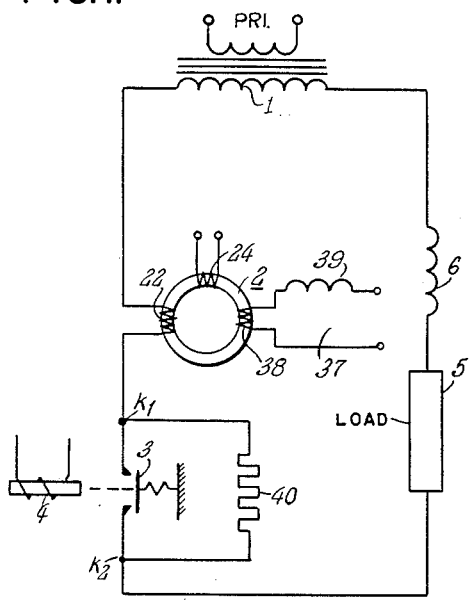
Figs. 7 and 8 represent modifications of circuits applicable in converter circuits otherwise corresponding to Fig. 1 or Fig. 6.

According to Fig. 7, the core of the commutation reactor 2 has, aside from a winding 24 for the above-described shaping circuit, a single premagnetizing winding 38. Winding 38 is energized from an alternating-voltage source through a stabilizing and adjusting reactor 39. Connected parallel to the contact device member 3 is a shunt path containing an ohmic resistor 40 or, instead, a series-parallel combination of ohmic impedance means and capacitors. By proper calibration of the shunt path and of the auxiliary circuits, a resulting premagnetization is obtained whose phase position and magnitude are such that the make step and break step, required for preventing damage to the contacts, just expire at the make moment and break moment determined by the control current in the coil 4.

Figure 8:
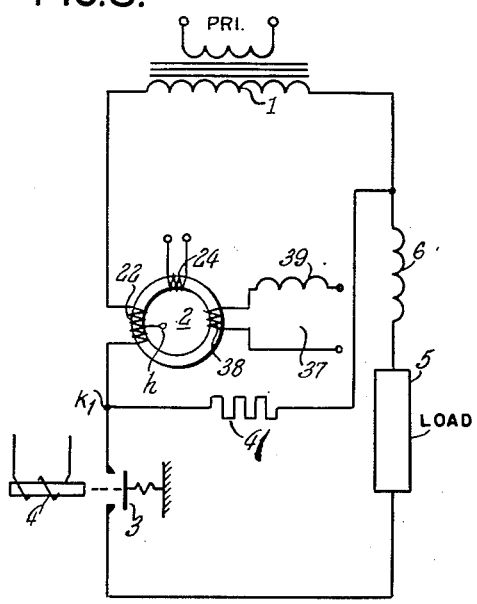

Fig. 8 shows an otherwise similar converter circuit in which the shunt path across the contact member 3 is substituted by a cross-phase circuit extending across the series arrangement of the energizing transformer winding 1 with the main winding 22 of the commutation reactor 2. The cross-phase circuit has an ohmic resistor 41 and, with resistor 41 properly dimensioned, secures a performance similar to that of the circuit arrangement according to Fig. 7. In embodiments according to Figs. 7 and 8, the magnet control coil 4 of the synchronous contact device may be connected either in accordance with Fig. 1 or as explained with reference to Fig. 2.

A converter according to Fig. 8 may be further improved by supplying the circuit 37 of winding 38 with a trapezoidal current instead of a sinusoidal alternating current. Such a trapezoidal current may be supplied, for instance, by a transductor circuit with two opposingly premagnetized and asymmetrical saturable reactors as disclosed in the copending application of M. Belamin for Series-Transductor Apparatus, Serial No. 311,395, filed September 25, 1952, and assigned to the assignee of the present invention. The trapezoidal current furnishes the respective constant components of the make and break premagnetizations. The voltage-dependent components for the two magnetizations may be supplied by the above-mentioned cross-phase circuit by impressing upon it a suitable additional voltage capable of balancing the voltage drops of the ohmic resistances of this premagnetizing current. Instead of impressing upon the cross-phase circuit an auxiliary voltage, the connection point $k_1$ of the cross phase circuit may be displaced to the midpoint $h$ (Fig. 8) of the reactor main winding 22. If, with such a modified circuit, a rather wide range of voltage control is desired, an additional valve may be connected in the cross phase circuit to suppress the premagnetizing current in the make direction, thus preventing a premature reversal of saturation in the commutation reactor during the make performance.

I claim:
1. An electric contact converter, comprising supply means for alternating current to be converted, a converter circuit connected to said supply means, a synchronous electromagnetic contact device having a movable contact member with an opening bias and having a magnet coil for closing said contact member against its bias, a saturable reactor series connected with said contact member and with said coil in said converter circuit for depressing the current near its zero passages during make-step and break-step intervals including the closing and opening moments respectively of said member, a control circuit connected with said supply means for initiating the closing of said contact member and having a periodic current synchronous with said alternating current, said control circuit being connected in parallel with the circuit comprising said series-connected reactor and contact member, and said magnet coil forming the only controlling link of said control circuit with said contact device.

2. An electric contact converter, comprising supply means for alternating current to be converted, a converter circuit connected to said supply means, a synchronous electromagnetic contact device having a movable contact members with an opening bias and having a magnet coil for closing said contact member against its bias, a saturable reactor series connected with said contact member and with said coil in said converter circuit for depressing the current near its zero passages during make-step and break-step intervals including the closing and opening moments respectively of said member, an asymmetrically conductive control circuit for initiating the closing of said contact member, said control circuit including a source of normally constant direct voltage and being connected with said converter circuit in series with said coil and in parallel with said series circuit comprising said reactor and contact member.

3. An electric contact converter, comprising alternating current supply means to be converted, a converter circuit connected to said supply means, a synchronous electromagnetic contact device having a movable contact member with an opening bias and having a magnet coil for closing said contact member against its bias, a saturable reactor series connected with said contact member and with said coil in said converter circuit for depressing the current near its zero passages during make-step and break-step intervals including the closing and opening moments respectively of said member, said reactor having auxiliary circuit means for providing separate make and break premagnetization at the respective times of said intervals, said circuit means including a premagnetizing winding on said reactor for controlling said premagnetization for said make-step interval, a control circuit coupled with said supply means and connected in series with said coil for initiating the closing of said contact member, said control circuit being connected in parallel with said series connected reactor and contact member circuit, and controllable valve means series connected in said control circuit, and control means common to said control circuit and said auxiliary circuit for jointly controlling the initiation of current flow in said control circuit and in said premagnetizing winding.

4. An electric contact converter, comprising alternating current supply means to be converted, a converter circuit connected to said supply means, a synchronous electromagnetic contact device having a movable contact member with an opening bias and having a magnet coil for closing said contact member against its bias, a saturable reactor series connected with said contact member and with said coil in said converter circuit for depressing the current near its zero passages during make-step and break-step intervals including the closing and opening moments respectively of said member, said reactor having auxiliary circuit means for providing premagnetization at the respective times of said intervals, said circuit means including a premagnetizing winding on said reactor for controlling the make-step premagnetization, a control circuit coupled with said supply means and having controllable valve means and two mutually parallel branches connected in series with said valve means, one of said branches being series-connected with said coil, said other branch being connected with said premagnetizing winding, said control circuit being connected in parallel with the series circuit comprising said reactor and contact member.

5. In an electric contact converter according to claim 3, said premagnetizing winding being connected in said control circuit in series relation to said coil.

6. In a converter according to claim 1, said control circuit comprising a gaseous discharge tube and a source of constant direct voltage in series connection with each other, said tube having a phase controllable firing circuit connected with said supply means.

7. In a converter according to claim 1, said control circuit comprising a valve and a source of adjustable direct voltage series connected with each other.

8. In a converter according to claim 1, said control circuit comprising a transductor and a valve series connected with each other, said transductor having a premagnetizing direct-current circuit comprising a current controlling circuit member.

References Cited in the file of this patent

UNITED STATES PATENTS

| | | |
|---|---|---|
| 2,502,932 | Diehold | Apr. 4, 1950 |
| 2,610,231 | Wettstein | Sept. 9, 1952 |
| 2,617,974 | Kesselring et al. | Nov. 11, 1952 |
| 2,619,628 | Kesselring | Nov. 25, 1952 |
| 2,680,831 | Belamin | June 8, 1954 |
| 2,693,569 | Diebold | Nov. 2, 1954 |

FOREIGN PATENTS

| | | |
|---|---|---|
| 113,439 | Sweden | Mar. 13, 1945 |
| 905,953 | France | Dec. 19, 1945 |